Figure 1:
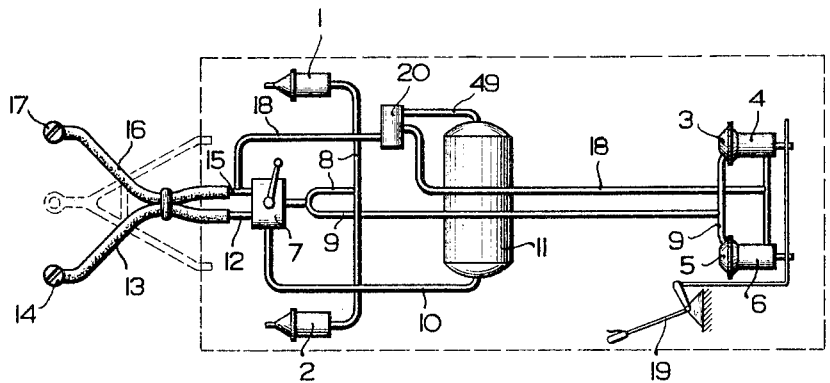

Sept. 13, 1966  O. VIELMO  3,272,567

BRAKE INSTALLATIONS FOR TRAILERS

Filed Oct. 7, 1964

INVENTOR
Oskar Vielmo
by Michael J. Striker 3,272,567
BRAKE INSTALLATIONS FOR TRAILERS
Oskar Vielmo, Stuttgart-Sonnenberg, Germany, assignor to Robert Bosch G.m.b.H., Stuttgart, Germany
Filed Oct. 7, 1964, Ser. No. 402,098
Claims priority, application Germany, Oct. 10, 1963, B 73,824
6 Claims. (Cl. 303—29)

The present invention relates to braking installations and in particular to a braking installation for a trailer which is to be hauled along a highway or the like by a motor truck.

In conventional brake installations of this type pneumatic brake means of the single-chamber type, for example, are provide for the wheels of the trailer, and the trailer itself carries a tank of compressed air controlled through a suitable control valve for applying the compressed air from the tank to the pneumatic brake means for retarding the movement of the trailer, and the tank can be supplied with compressed air from a source carried by the motor truck and in addition a control line makes the control valve respond to actuation of the brakes of the motor truck in order to control the application of compressed air from the tank to the pneumatic brakes. In addition, it is known to provide such trailers with spring brakes of a known type which are rendered non-operative when they are subjected to the pressure of the compressed air and which become operative to retard the movement of the trailer when the pressure of the compressed air is eliminated and the spring brakes are at atmospheric pressure.

The spring brakes are used for preventing movement of the trailer when it is stationary and either still connected to the motor truck or separated therefrom. Such spring brakes can be applied only to the rear wheels so that their braking force will not have any tendency to change the direction of movement of the trailer.

One of the objects of the present invention is to provide for a brake installation of the above type spring brakes which will not only respond when they are at atmospheric pressure but which also will apply their braking force to the trailer when the pressure of the compressed air in the trailer tank falls below a given value.

In addition, it is an object of the present invention to provide a spring brake system capable of applying their braking force to the trailer when the compressed air pressure drops below a given value in such a way as to provide not only a braking force for safety purposes but also for warning purposes so that the operator of the motor truck will know that something is wrong.

In addition, it is an object of the present invention to provide a brake system in which the spring brakes will apply their full braking force in a relatively short time when the pressure of the compressed air drops below a given value.

With these objects in view the invention includes, in a brake installation for a trailer which is adapted to be hauled by a motor truck, spring brake means which communicate directly with the filling line which fills the compressed air tank of the trailer, so that the spring brakes are subjected to the full force of the compressed air supplied to the tank carried by the trailer, and the spring brake means when subjected to this force of compressed air are rendered inoperative. A flow control means of the invention communicates with the compressed air tank as well as with the conduit which supplies compressed air to the spring brake means for automatically placing the latter in communication with the outer atmosphere when the pressure of the compressed air in the tank falls below a given value, so as to automatically cause the spring brake means to respond and retard the movement of the trailer when the pressure of the compressed air in the tank falls below this given value.

Figure 2:
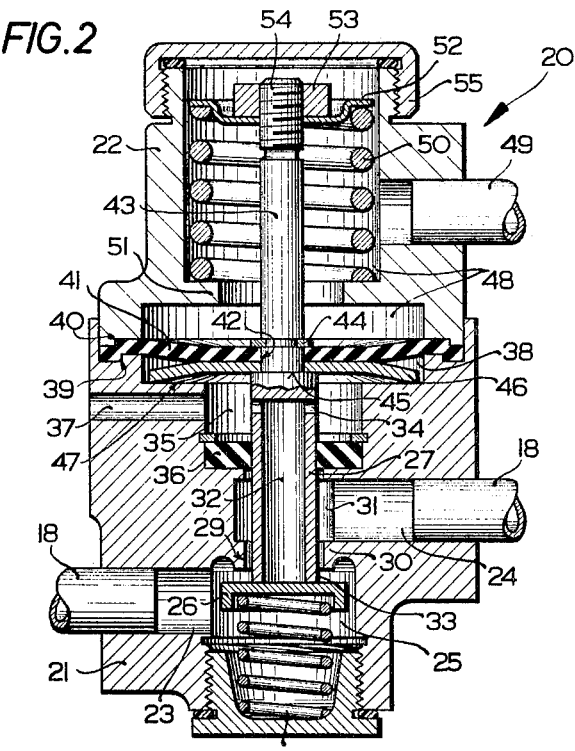

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a schematic illustration of one possible embodiment of a braking installation for a trailer, in accordance with the present invention; and FIG. 2 is a sectional elevation of a flow control unit of the present invention.

The trailer which is schematically illustrated in dotted lines in FIG. 1 has its front end supported by a carriage which is turnable with respect to the remainder of the trailer and which has for the front wheels a pair of single-chamber pneumatic brake cylinders 1 and 2 of conventional construction. The wheels of the rear axle of the trailer can be braked by a pair of single-chamber pneumatic brake means 3 and 5 which also are of conventional construction. A pair of spring brake means 4 and 6 which are of a well known construction are also provided for the rear trailer wheels, and the spring brake means 4 and 6 respectively form unitary assemblies with the pneumatic brake means 3 and 5. The plurality of pneumatic brake means 1, 2, 3 and 5 are capable of applying their braking force in response to an increase of pressure of compressed air supplied thereto, and when they are not operating the plurality of pneumatic brake means are at atmospheric pressure. However, the pair of spring brake means 4 and 6 are of a known construction which is placed in a non-braking position as long as compressed air is supplied thereto, and the pair of spring brake means 4 and 6 respond to apply their braking force to the trailer when the pair of spring brake means are at atmospheric pressure.

The structure includes a known control valve means 7 which communicates with pneumatic brake conduit means 8 and 9, situated downstream of the control valve means 7, the pneumatic brake conduit means 8 providing communication between the control valve 7 and the front brake means 1 and 2 while the pneumatic conduit means 9 provides communication between the valve 7 and the rear pneumatic brake means 3 and 5. The trailer carries a compressed air tank 11 which communicates through a conduit 10 with the control valve means 7. Upstream of the control valve means 7, this control valve means communicates with a conduit 12 which in turn communicates with a flexible brake line 13 in the form of a flexible hose, for example, and through a suitable coupling head 14 the brake line 12, 13 communicates with the motor truck which hauls the trailer in such a way that when the brakes of the motor truck are applied the pressure in the brake line 12, 13 will increase while when the brakes of the motor truck are not applied the pressure in the line 12, 13 will drop. Thus, the brake line 12, 13 communicates with the brake conduits of the motor truck. Connected in parallel with the brake line 12, 13 is a filling line 15, 16 situated upstream of and communicating with the control valve 7 and including the conduit 15 which is directly connected to the control valve means 7 and the flexible hose 16 connected to and forming an extension of the conduit 15, this flexible hose 16 of the filling line communicating through a suitable coupling 17 with the source of compressed air which is carried by the motor truck, and it is through the filling line 15, 16 as well as the valve 7 and the conduit 10 that the tank 11 is supplied with compressed air.

The control valve means 7 can be of any well known construction which operates in such a way that through the filling line 16 the tank 11 is maintained at a preselected pressure while in response to pressure changes in the brake line 12, 13 the valve 7 automatically operates to supply compressed air from the tank 11 to the several pneumatic brake means 1, 2, 3 and 5. When the trailer is separated from the motor truck, or from another trailer of a series of trailers connected to the motor truck, the filling line 16 of course communicates with the outer atmosphere, and in response to the drop in pressure in the filling line 16 the valve 7 automatically connects the tank 11 to the several pneumatic brake means so that the trailer is automatically braked under these conditions. Very many types of well known control valve means 7 operate in this way and inasmuch as the details of the control valve means 7 do not form part of the present invention this control valve means 7 is not illustrated or described in greater detail.

The above-described brake installation for a trailer is amplified, in accordance with the invention, by the pair of spring brake means 4 and 6. A spring brake conduit means 18 communicates with the conduit 15, upstream of the control valve 7, and also communicates with the pair of spring brake means 4 and 6, so that in this way compressed air is supplied to a pair of spring brake means 4 and 6 directly from the filling line 16. In this way the spring brakes are subjected to the pressure of the compressed air in the filling line 15, 16 and this compressed air in a known way compresses the springs of the spring brake means and thus maintains the spring brake means in a non-braking position. It is also possible in a known way to control the pair of spring brake means 4 and 6 through a suitable cable and a hand lever to which the operator applies his own force, so that in this way the spring brakes can be manually controlled, and a manually operable lever 19 is shown diagrammatically in FIG. 1 connected with a pair of spring brakes 4 and 6 so as to render them manually operable by the operator.

In accordance with a further feature of the present invention a flow control means 20 is connected into the spring brake conduit means 18 so as to divide the latter into an upstream portion extending from the flow control means 20 to the conduit 15 and a downstream portion extending from the flow control means 20 to the pair of spring brake means 4 and 6. The flow control means 20 also communicates with the tank 11 through a conduit 49. This flow control means 20 of the present invention senses the pressure of the compressed air in the tank 11, and when this pressure drops below a given valve the flow control means 20 automatically cuts off communication between the upstream and downstream portions of the conduit 18 and places the downstream portion thereof in communication with the outer atmosphere so that the pair of spring brake means 4 and 6 automatically apply their braking force to the trailer under these conditions.

Referring now to FIG. 2, the flow control means 20 includes a housing having a pair of housing portions 21 and 22 which define the hollow interior of the housing, these housing portions 21 and 22 being fixed to each other. The lower housing part 21 is formed with a bore 23 which communicates with the upstream portion of the conduit 18, and this conduit 23 communicates with a chamber 25 which is closed off from the outer atmosphere by a suitable plug shown in the lower part of FIG. 2 and which serves to house a valve member 26. A spring 28 situated in the chamber 25 urges the valve member 26 toward a valve-closing position, and an elongated tubular transmission member 27 has a bottom open end engaging the valve member 26, and holding the latter against the force of the spring 28 in an open position shown in FIG. 2. The lower housing part 21 has an annular valve seat 30 which extends across the top of the chamber 25 and which forms a valve seat for the valve member 26, and the tubular transmission member 27 extends through the valve seat 30 with a clearance sufficient to provide in the valve seat 30 an annular passage 29 surrounding the tubular member 27 and extending completely through the valve seat 30. The lower housing part 21 has over the valve seat 30 a chamber 31, and this chamber communicates through a bore 24 with the downstream conduit portion 18 which is connected to the housing 21 in a fluid tight manner at the bore 24 thereof. The bore 32 of the tubular transmission means 27 extends from the bottom end thereof upwardly along the interior thereof and terminates at a location beneath a pressure responsive member 41 in the form of a flexible resilient diaphragm. Thus, the open bottom end 33 of the tubular member 27 directly engages the valve member 26. The tubular member 27 is formed at the top end of the bore 32 thereof with openings 34 passing through the wall of the tubular member so as to provide communication between the interior and exterior thereof, and these openings 34 are situated at all times in a chamber 35 which communicates through a bore 37 of the housing part 21 with the outer atmosphere, so that the interior 32 of the transmission member 27 is at all times at atmospheric pressure. A partition means 36 in the form of a suitable resilient sealing member is carried by and extends across the interior of the lower housing part 21 so as to divide the latter into the upper chamber 35 which communicates with the outer atmosphere and a lower chamber which is provided with the valve seat 30. The tubular transmission member 27 extends fluid-tightly and slidably through the partition means 36.

The pressure-responsive member 41 is in the form of a flexible resilient diaphragm which is clamped at its outer periphery between the housing parts 21 and 22. Thus, FIG. 2 shows the edge portions 39 and 40 of the housing parts 21 and 22 between which the elastic diaphragm 21, made of rubber, for example, is clamped. This diaphragm 41 extends over a widened portion 38 of the chamber 35. The tubular transmission member 27 has an elongated portion 43 of reduced diameter extending fluid-tightly through and fixed to the diaphragm 41 so that the transmission member 27 will move when the diaphragm 41 moves. Thus, the diaphragm 41 is formed with central opening 42 through which portion 43 of the transmission member extends, and a snap ring 44 is situated in a groove of the portion 43 of member 27 just above the diaphragm 41, while a shoulder 45 of member 27 engages a washer 46 situated just beneath and engaging diaphragm 41, this washer 46 having a downwardly directed outer periphery engaging the surface 47 in the housing part 21 at the widened chamber portion 38 thereof.

Within the upper housing part 22 there is situated over the diaphragm 41 a chamber 48 with which the conduit 49 communicates in a fluid-tight manner, this conduit 49 also communicating with the tank 11 as also pointed out in connection with FIG. 1. The housing part 22 is formed with an inwardly directed annular flange 51 against which the bottom end of a coil spring 50 is seated, and this coil spring 50 surrounds the reduced portion 43 of the transmission member 27 and engages at its upper end a washer 52 which is held by a nut 53 on a threaded upper end portion 54 of the reduced diameter portion 43 of the transmission member 27. By turning the nut 53 it is therefore possible to adjust the force of the spring means 50, and this spring means urges the pressure responsive diaphragm 41 in a direction opposite to the direction in which it is urged by the force of the compressed air from the tank 11. Access may be had to the nut 53 at the top of the chamber 48 by removing therefrom a closure member 55 which is threaded onto the housing part 22 and closes the latter in a fluid-tight manner. It is to be noted that the spring 28 as well as the spring 50 opposes the force acting downwardly on the diaphragm 41.

It is thus apparent that the pressure responsive diaphragm 45 divides the interior of the housing 21, 22 into a pair of chambers, one of which, namely the chamber 48, communicates through the conduit 49 with the tank 11 of compressed air, while the other of the chambers is divided by the partition means 36 into a pair of subchambers, and the subchamber 35 communicates at all times with the outer atmosphere through the opening 37, whereas the other subchamber is provided with the annular valve seat 30 on one side of which is situated the valve member 26 and the upstream portion of the conduit 18 while the downstream portion of the conduit 18 is situated on the other side of the valve seat 30 through which the transmission member 27 extends with clearance as pointed out above.

The above-described structure operates as follows:

When the trailer is connected in a normal manner to the motor truck so as to be hauled thereby, the tank 11 is provided with compressed air through the filling line 16, the control valve 7, and the conduit 10, the pressure of the compressed air being controlled by a pressure regulator and a compressor which is carried by the motor truck and which provides the compressed air at a predetermined relatively high pressure, and through the conduit 49 this pressure prevails in the chamber 48 of the flow control means 20. This pressure acts on the diaphragm 41 and holds it at its lower position where the washer 46 engages the surface 47, and in this position the transmission member 27 maintains the valve member 26 displaced from the valve seat 30. The size and resiliency of the diaphragm 41 as well as the forces of the springs 28 and 50 are chosen in such a way that the diaphragm takes the position shown in FIG. 2 as long as the pressure of the compressed air in the tank 11 is above a given predetermined limiting value, such as, for example, 4 atmospheres. At a pressure of this value it is possible for the four pneumatic brake means 1, 2, 3 and 5 to provide a satisfactory braking force on the trailer while providing safe operation for the motor truck and trailer.

Between a normal operating pressure of 6 atmospheres, for example, and the lower pressure limit of 4 atmospheres the valve member 26 remains displaced from the valve seat 30, so that the upstream and downstream portions of the conduit 18 communicate freely with each other through the clearance space 29 in the valve seat 30 which surrounds the tubular transmission member 27. As a result, the operating chambers of the pair of spring brake means 4 and 6 are provided with the pressure of the compressed air in the filling line 16, and this pressure will normally be 6 atmospheres. The spring brakes are therefore maintained in their inoperative non-braking positions since they are so designed that even at as low a pressure as 4 atmospheres the springs will not apply any braking force while at atmospheric pressure they will apply a braking force to the rear wheels of the trailer, and the force provided by the pair of spring brake means 4 and 6 to retard the movement of the vehicle is substantially equal to the total braking force which can be applied by all of the pneumatic brake means at the minimum pressure of 4 atmospheres, so that each spring brake means 4 and 6 is capable of applying a braking force equal to that which can be applied by any two pneumatic brake means at this minimum pressure of 4 atmospheres.

If for any reason, such as, for example, an undesired loosening or uncoupling of the coupling head 17, the filling line 16 drops in pressure and communicates with the outer atmosphere so as to be at atmospheric pressure, the control valve means 7 will in a known way automatically respond in order to apply the pneumatic brakes 1, 2, 3 and 5 with the compressed air available in the tank 11, and the trailer will in a normal way have its wheels braked by the plurality of pneumatic brake means. In addition, however, the pair of spring brake means 4 and 6 will respond, since the conduit 18 is placed in communication with the outer atmosphere through the conduit 16, and this automatic additional force from the pair of spring brake means will be provided unless of course there is a structure such as a non-return valve provided in the conduit 15 for some special reason.

The above operation, which provides a certain safety factor for the vehicle by automatically applying the brakes thereof when the pressure in the line 16 drops, only becomes effective when this latter pressure becomes substantially equal to atmospheric pressure. If, on the other hand, there is only a relatively small leak in the hose 16, or if for some reason the compressor does not maintain the pressure in the tank 11 up to the preselected value, then the operator of the vehicle is not even aware of these conditions and the pressure in the tank 11 will drop because, for example, at each operation of the brakes more air is consumed than is supplied to the tank 11. It is also possible for the air pressure to drop if the tank 11 itself or any part of the conduit system 9, 10 of the trailer lose their fluid-tightness. It is under these latter operating conditions that the present invention provides an additional safety factor in the operation, since as soon as the pressure in the tank 11 drops to a predetermined value, which is below a satisfactory operating value by a certain amount, the structure of the invention will operate to cause the spring brakes 4 and 6 to respond automatically.

Inasmuch as the flow control means 20, which is preferably situated near the tank 11, responds to every pressure change in the tank 11 with a similar pressure change in its chamber 48, but on the other hand because of its construction described above will only be actuated when the pressure drops to a value below a predetermined lower limit, in the above example 4 atmospheres or less, it is possible to maintain the normal brake operation of the trailer as long as the structure has no defects or if the extent of the leak is relatively minor, and initially the installation will not be influenced by the flow control unit 20. As soon as, however, the pressure in the tank 11 and thus the pressure in the chamber 48 falls to a value of 4 atmospheres or less, this pressure is not sufficiently great to maintain the diaphragm 41 in its lower position shown in FIG. 2 where the valve 26 remains displaced from the valve seat 30, and as a result the spring 50 pulls the diaphragm 41 upwardly so that the transmission member 27 also is displaced upwardly, and it will be noted that until the valve member 26 engages the valve seat 30 the force of the spring 28 contributes to this action. When the valve member 26 engages the valve seat 30 the clearance space 29 in the valve seat 30 will be closed so that the communication between the upstream and downstream portions of the conduit 18 will be cut off, and thus the supply of compressed air to the pair of spring brake means 4 and 6 terminates. Inasmuch as the tubular transmission 27 has continued to move upwardly and is thus displaced upwardly beyond the valve member 27, so that the bottom open end 33 of the member 27 is no longer closed by the valve member 26, the downstream portion of the conduit 18 is capable of communicating through the chamber 31, the interior 32 of the tubular member 27, the openings 34 thereof, the chamber 35, and the bore 37 with the outer atmosphere. As a result the operating chambers of the pair of spring-pressure means 4 and 6 are placed at atmospheric pressure, and this pair of brake means now responds to apply the braking force to the rear wheels of the trailer. Inasmuch as the flow control means 20 operates in a manner where it has either a position providing full communication between the upstream and downstream portions of the conduit 18 or a position providing for atmospheric pressure at the pair of spring brake means 4 and 6, this flow control means 20 of the invention reacts very quickly to the change in pressure irrespective of whether the loss of pressure in the tank 11 takes place quickly or slowly. In this way it is not possible with the structure of the invention to provide over a long period of time only partially applied rear brakes. In spite of this fact, the spring brake means do not apply the braking force in a sudden jerky manner, because through suitable dimensions of the cross-sectional areas through which the air flows in the flow control 20 there is provided a restricted or throttled flow of air into the outer atmosphere which with the particular design of the flow control means 20 will result in application of the full braking force within, for example, a time span of approximately three to four seconds.

It is to be noted that with the above-described structure of the invention not only is there provided an essential braking of the trailer when there is a predetermined drop in air pressure, but in addition there is provided a condition where the trailer can no longer be hauled by the trailer truck unless the trouble is corrected, so as to reestablish in the tank 11 the pressure of at least 4 atmospheres. Furthermore, with the above-described structure, it is not possible to pull the trailer if the operator forgets to couple the filling line 16 to the source of compressed air in the motor truck.

It will be understood that each of the elements described above or two or more together, may also find a useful application in other types of brake installations differing from the types described above.

While the invention has been illustrated and described as embodied in trailer brake installations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a braking installation for a trailer which is adapted to be hauled by a motor truck, in combination, a plurality of pneumatic brake means and spring brake means adapted to brake wheels of the trailer; control valve means; filling and brake lines situated upstream of and communicting with said control valve means, said filling line being adapted to communicate with a source of compressed air at the motor truck and said brake line being adapted to transmit pressure changes resulting from operation of brakes of the motor truck; a compressed air tank carried by the trailer, said tank communicating with said control valve means; pneumatic brake conduit means communicating with said plurality of pneumatic brake means and situated downstream of and communicating with said control valve means, said control valve means maintaining compressed air in said tank at a pressure determined by the pressure of compressed air in said filling line and said control valve means responding to pressure changes in said brake line for applying to said plurality of pneumatic brake means compressed air from said tank to apply the pneumatic brake means for retarding the movement of the trailer; spring brake conduit means communicating with said spring brake means and with said filling line upstream of said control valve means so that the compressed air flows from said filling line directly to said spring brake means and said spring brake means responding to the pressure of the compressed air derived from the filling line for remaining in an inoperative, non-braking position, while when said spring brake conduit means is at atmospheric pressure said spring brake means automatically responds to apply its braking force to the trailer for retarding the movement thereof; and flow control means communicating with said tank and connected into said spring brake conduit means and dividing the latter into an upstream portion extending from said flow control means to said filling line and a downstream portion extending from said flow control means to said spring brake means, said flow control means automatically placing said downstream portion of said spring brake conduit means in communication with the outer atmosphere when the pressure of the air in said tank falls below a predetermined value, so that said spring brake means will become operative to retard movement of the trailer when the pressure in said tank is below said value.

2. In an installation as recited in claim 1, said flow control means including a valve situated between said upstream and downstream portions of said spring brake conduit means for cutting off communication between said portions when said valve is closed and for maintaining communication between said portions when said valve is open, and a movable pressure responsive member also forming part of said flow control means, exposed to the pressure in said tank, and operatively connected to said valve of said flow control means for maintaining the latter valve open as long as the pressure in the tank does not fall below said predetermined value.

3. In an installation as recited in claim 2, said flow control means including a transmission member extending between said pressure responsive member and said valve for transmitting movement of said pressure responsive member to said valve, said transmission member communicating with the outer atmosphere and placing said downstream portion of said spring brake conduit means in communication with the outer atmosphere after said valve closes.

4. In an installation as recited in claim 1, said flow control means including a hollow housing carrying in its interior a pressure responsive flexible diaphragm which extends across the interior of said housing and divides the latter into a pair of chambers one of which communicates with said tank, spring means in said one chamber acting on said diaphragm for urging the latter in the direction opposite to that in which said diaphragm is urged by the pressure of the air in said tank and in said one chamber, partition means in the other of said chambers dividing said other chamber into a pair of subchambers one of which communicates with the outer atmosphere, an annular valve seat extending across the other of said subchambers, said portions of said spring brake conduit means communicating with said other subchamber on opposite sides of said valve seat therein, a valve member situated in that part of said other subchamber which communicates with said upstream portion of said spring brake conduit means, a spring urging said valve member toward said valve seat, and an elongated tubular motion transmitting member connected to said diaphragm, extending fluid-tightly through said partition means, and extending with clearance through said valve seat and engaging said valve member to maintain the latter displaced from said valve seat as long as the pressure in said tank is above said predetermined value, said tubular transmission member being formed with at least one opening passing therethrough and situated in said one subchamber to provide communication between the interior of said hollow transmission member and said one subchamber, said tubular transmission member having an open end engaging said valve member, so that when the pressure in the tank drops below said predetermined value said diaphragm will be displaced to a location situating said transmission member beyond said valve member which engages said valve seat to cut off communication between said portions of said spring brake conduit means and to provide communication between said downstream portion of said latter conduit means and the outer atmosphere.

5. In an installation as recited in claim 1, said spring brake means including a plurality of said spring brakes which, when they are operative, apply to the trailer a braking force substantially equal to that applied by said plurality of pneumatic brake means.

6. In an installation as recited in claim 5, said plurality of spring brake means acting only on rear wheels of said trailer.

References Cited by the Examiner
UNITED STATES PATENTS

| | | | |
|---|---|---|---|
| 2,859,763 | 11/1958 | Fites | 303—8 X |
| 3,118,706 | 1/1964 | Gold et al. | 303—6 |

EUGENE G. BOTZ, *Primary Examiner.*